(12) United States Patent
Harper et al.

(10) Patent No.: US 8,578,697 B2
(45) Date of Patent: Nov. 12, 2013

(54) FAN SECTION

(75) Inventors: Cedric B. Harper, Derby (GB); Neil Humphries, Derbyshire (GB)

(73) Assignee: Rolls-Royce PLC, London (GB)

(*) Notice: Subject to any disclaimer, the term of this patent is extended or adjusted under 35 U.S.C. 154(b) by 851 days.

(21) Appl. No.: 12/385,203

(22) Filed: Apr. 1, 2009

(65) Prior Publication Data

US 2009/0277153 A1 Nov. 12, 2009

(30) Foreign Application Priority Data

May 6, 2008 (GB) .................................. 0808125.9

(51) Int. Cl.
*F02K 3/06* (2006.01)
*B64D 33/02* (2006.01)

(52) U.S. Cl.
USPC .................... 60/226.1; 244/53 B; 181/214

(58) Field of Classification Search
USPC .............. 60/226.1; 137/15.1, 15.2; 244/53 B; 181/213, 214; 415/119
See application file for complete search history.

(56) References Cited

U.S. PATENT DOCUMENTS

| | | | |
|---|---|---|---|
| 3,948,346 A * | 4/1976 | Schindler ..................... | 181/286 |
| 4,111,081 A * | 9/1978 | Hilliard et al. ................ | 181/290 |
| 4,235,303 A * | 11/1980 | Dhoore et al. ................ | 181/214 |
| 4,475,624 A * | 10/1984 | Bourland et al. ............. | 181/292 |
| 4,849,276 A * | 7/1989 | Bendig et al. ................. | 428/117 |
| 5,414,232 A * | 5/1995 | Wilson .......................... | 181/292 |
| 5,594,216 A * | 1/1997 | Yasukawa et al. ............ | 181/213 |
| 5,649,419 A | 7/1997 | Schaut | |
| 5,743,488 A * | 4/1998 | Rolston et al. ............... | 244/53 B |
| 6,609,592 B2 * | 8/2003 | Wilson .......................... | 181/292 |
| 6,619,913 B2 * | 9/2003 | Czachor et al. ............... | 415/119 |
| 7,165,368 B2 * | 1/2007 | Knapp ........................... | 52/449 |
| 7,328,771 B2 * | 2/2008 | Costa et al. ................... | 181/214 |
| 7,503,164 B2 * | 3/2009 | McMillan ..................... | 60/226.1 |
| 7,510,052 B2 * | 3/2009 | Ayle ............................... | 181/292 |
| 7,870,929 B2 * | 1/2011 | Farstad ........................... | 181/214 |
| 7,921,966 B2 * | 4/2011 | Chiou et al. .................. | 181/292 |
| 7,923,668 B2 * | 4/2011 | Layland et al. ............... | 219/535 |
| 7,963,362 B2 * | 6/2011 | Lidoine ......................... | 181/214 |
| 8,028,797 B2 * | 10/2011 | Douglas ........................ | 181/213 |
| 2003/0141144 A1 * | 7/2003 | Wilson .......................... | 181/292 |
| 2005/0178489 A1 | 8/2005 | Belleguic et al. | |
| 2006/0169532 A1 * | 8/2006 | Patrick .......................... | 181/210 |
| 2007/0267246 A1 * | 11/2007 | Ali et al. ....................... | 181/214 |

FOREIGN PATENT DOCUMENTS

| | | |
|---|---|---|
| EP | 1 336 739 A2 | 8/2003 |
| EP | 1 510 657 A1 | 3/2005 |
| EP | 1 880 941 A2 | 1/2008 |
| FR | 2 317 504 | 2/1977 |
| GB | 1 490 923 A | 11/1977 |

OTHER PUBLICATIONS

May 23, 2013 Search Report issued in European Patent Application No. 09 25 0891.

* cited by examiner

*Primary Examiner* — Phutthiwat Wongwian
*Assistant Examiner* — Michael B Mantyla
(74) *Attorney, Agent, or Firm* — Oliff & Berridge, PLC

(57) ABSTRACT

A composite component such as a fan casing liner panel for a gas turbine engine comprises an abradable layer and a layer. The layer is provided with a septum layer, to which the abradable layer is bonded. The septum layer is perforated by holes, which enable air to be extracted from the region between the septum layer and the abradable layer during the process of bonding the components together, for example by a vacuum bonding process.

12 Claims, 4 Drawing Sheets

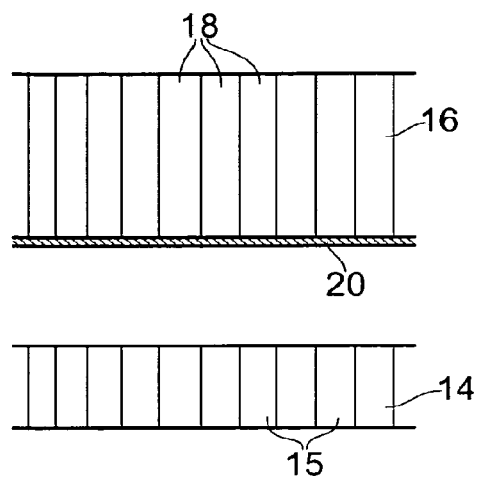
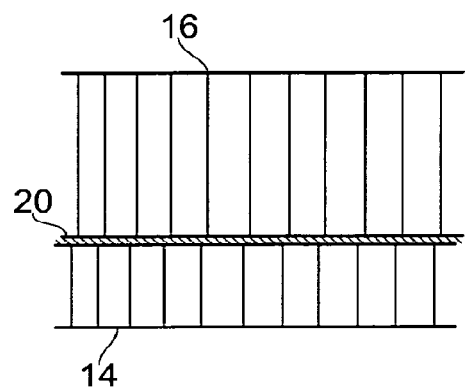
FIG. 2
FIG. 3
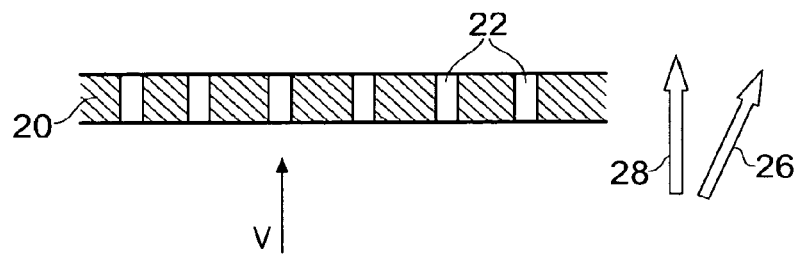
FIG. 4
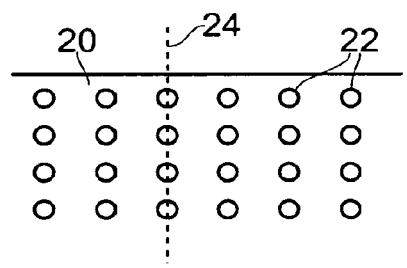
FIG. 5

FAN SECTION

This invention relates to a fan section of a gas turbine engine, and is particularly, although not exclusively, concerned with a composite component in the form of a fan casing liner panel for a gas turbine engine.

Gas turbine engines have various components which are constructed in the form of composite panels. More specifically, casing components, such as fan casings, may be made up of, or include, such composite components. In particular, a fan casing of a gas turbine engine may comprise a liner which is a composite component comprising a layer of cellular metallic material that provides a structure which resists ice impact and allows a fan blade or fragment of a fan blade which is separated from the fan itself to penetrate during a fan blade off event, and an abradable layer which is abraded by the fan blade tips in operation of the engine to form a close-fitting channel around the rotating fan to minimise gas leakage between the fan blade tips and the liner panel. It is known for a continuous septum layer, for example of a composite material such as glass-reinforced plastic (GRP) to be provided between the cellular metallic material and the abradable layer.

In practice, the cellular metallic material may be an open-cell material, ie the cells are not closed from the exterior of the material. The septum layer may initially be bonded to one face of the cellular metallic material and subsequently the abradable layer may be bonded over its full surface area to the septum layer on the face opposite the cellular metallic material. With such a construction, it is very important that the bond between the abradable layer and the septum layer is continuous, without any trapped air bubbles or regions where the bond is otherwise ineffective. If such air bubbles are present, they reduce the effectiveness of the overall bond with the result that the abradable layer, or part of it, may become separated from the septum layer to be entrained in the gas flow through the engine, causing possible consequential damage. Also, poorly bonded regions of the abradable layer may bulge away from the septum layer creating bulges on the air-washed surface of the fan liner. This can affect the air flow over the air-washed surface so reducing performance, and can cause excessive rubbing of the fan blade tips against the abradable layer.

Fan casing liner panels also need to be able to respond appropriately to ice particles shed from the fan, and to blades, or blade fragments which may become detached from the fan. The fan casing liner panel needs to be able to withstand impact from ice particles, so that such particles will be deflected from the panel back into the gas stream flowing through the engine. Fan blades or fragments should pass through the abradable layer into the cellular metallic material, or any other containment system provided in the fan casing, so that such blades or fragments are trapped and prevented from returning to the gas flow through the engine.

According to the present invention there is provided a fan casing liner panel for a gas turbine engine which includes a fan having radially extending fan blades from which ice may be shed in a first direction during operation of the engine, and from which fan all or part of the blade may become detached so as to be ejected from the fan in a second direction during operation of the engine, the fan casing liner panel comprising a first sheet element of composite material and a second sheet element of cellular material having a septum layer on one surface of the cellular material, the first sheet element being bonded in face to face relationship to the septum layer of the second sheet element, wherein the septum layer is perforated, and the perforations comprise holes disposed in rows which are aligned with the second direction but are inclined to the first direction.

The cellular material of the second sheet element may comprise elongate cells which extend in a direction across the thickness of the second sheet element. The cells may extend perpendicularly between the opposite faces of the second sheet element but in some embodiments they may be inclined to the perpendicular direction. The cellular material of the second sheet element may be a metallic material, such as a lightweight alloy conventionally used in the aerospace industry.

The material of the first sheet element may be a cellular composite material, such as a matrix of composite material having cells which are filled with a filler. The filler may be an abradable material.

In one embodiment, the first sheet element is bonded to the septum layer over substantially the full area of the first sheet element.

The perforations in the septum layer comprise holes, which may be circular, having a transverse dimension or diameter which is not less than 1 mm. Adjacent holes may be spaced apart by a distance of not less than 4 mm, and the holes may be disposed in an array comprising linear rows.

Another aspect of the present invention provides a method of manufacturing a fan casing liner panel as described above, which method comprises the steps of:
applying a bonding agent to at least one of the first sheet element and the septum layer;
placing the first sheet element and the septum layer in face to face contact with the bonding agent between them;
placing the first sheet element and the second sheet element in an enclosure;
evacuating the enclosure to draw air through the perforated septum layer from the region between the first sheet element and the septum layer; and
causing or allowing the bonding agent to set or cure.

The gas turbine engine includes a fan having radially extending fan blades from which ice may be shed in a first direction during operation of the engine and from which fan, all or part of a blade may become detached so as to be ejected from the fan in a second direction during operation of the engine, the perforations in the septum layer comprising holes disposed in rows which are aligned with the second direction but are inclined to the first direction.

In one embodiment the rows in which the holes are disposed extend circumferentially with respect to the rotational axis of the fan.

For a better understanding of the present invention, and to show more clearly how it may be carried into effect, reference will now be made by way of example, to the accompanying drawings, in which:

FIG. 2 shows components of a liner panel of the fan casing of FIG. 1;

FIG. 3 shows the components of FIG. 2 bonded together;

FIG. 4 shows, on an enlarged scale, a septum layer of one of the components of FIG. 2;

FIG. 5 is a view in the direction of the arrow V in FIG. 4;

Figure 1:
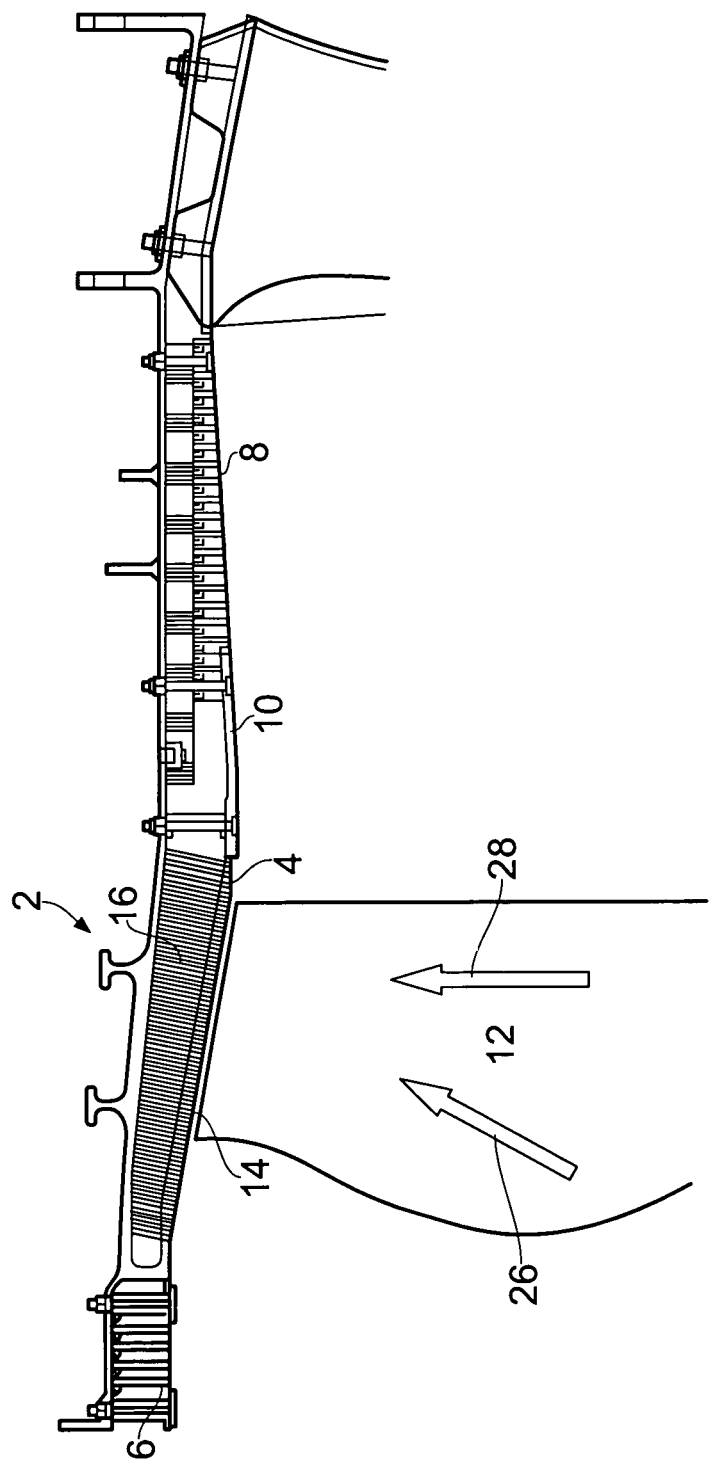
FIG. 1 is a sectional view through a fan casing of a gas turbine engine.

The fan casing shown in FIG. 1 comprises a casing wall 2 which is provided with a liner panel 4. Ahead of the liner panel 4, there is a front acoustic panel 6, and to the rear there is a rear acoustic panel 8. An ice impact panel 10, for example of a GRP material, is situated between the liner panel 4 and the rear acoustic panel 10.

A fan, represented by a single blade 12, rotates about an axis which extends from left to right in FIG. 1 below the section of blade 12 which is shown. The fan is situated in the engine at the same axial position as the liner panel 4.

The liner panel 4 comprises an abradable layer 14 in the form of a first sheet element, and a cellular layer 16, in the form of a second sheet element.

The cellular layer 16 is made from a metallic material, such as a conventional aerospace alloy and is formed in an open-cell configuration having elongate cells 18 (see FIG. 2) which extend from one side of the layer 16 to the other. The cells 18 may be of a honeycomb configuration. FIG. 2 shows the layer 16 and the abradable layer 14 in schematic form, in which the cells 18 extend perpendicularly between the opposite faces of the layer 16. Alternatively, as shown in FIG. 1, the cells 18 may extend obliquely with respect to a plane extending perpendicular to the rotational axis of the fan 12.

The face of the layer 16 directed towards the abradable layer 14 is provided with a septum layer 20 which is bonded to one face of the metallic cellular material of the layer 16. The septum layer 20 may be made from a GRP material.

The abradable layer 14 as shown in FIG. 2 also comprises a cellular material with cells extending perpendicularly between the opposite faces of the layer 14. The cellular material may be in the form of a honeycomb material made from a form of paper based on aramid or glass fibres, dipped in a phenolic resin. The cellular material provides a matrix, the cells being filled with suitable abradable filler. Such a cellular material is available commercially under the trademark Nomex.

As shown in FIG. 3, one face of the abradable layer 14 is bonded to the septum layer 20 of the layer 16.

The septum layer 20 is perforated by holes 22, as shown in FIGS. 4 and 5. The holes 22 are disposed in an array comprising rows, one of which is identified by a dashed line 24. In one embodiment of the present invention, the rows 24 extend circumferentially about the rotational axis of fan 12. In other words, the holes 22 of a single row 24 lie in a common plane extending perpendicular to the rotational axis.

Figure 6:
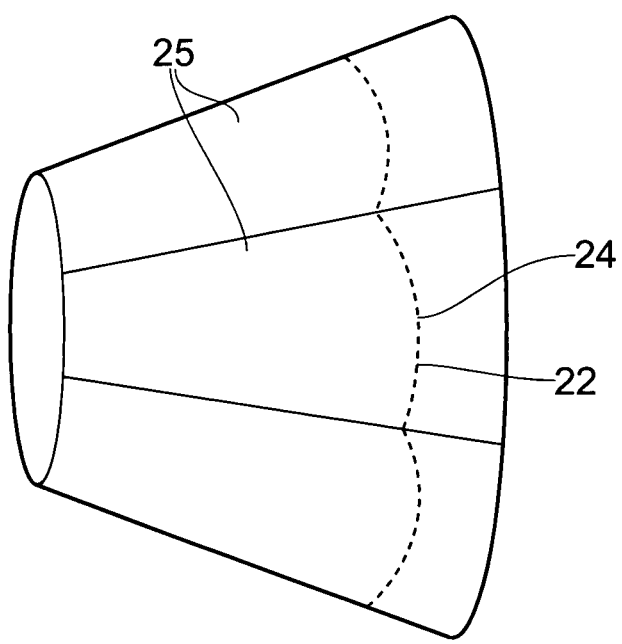
FIG. 6 shows a conical septum layer isolated from a liner and made from a series of shaped panels.

In an alternative embodiment as shown in FIG. 6, the septum layer 20 of a conical liner is formed from a plurality of flat panels 25. The rows 24 of holes 22 are formed in the flat panels 25 prior to assembly of the liner 4. Hence when assembled to form the septum layer 20, the rows 24 of holes 22 on each panel will be curved relative to the circumferential direction. That is to say, the rows 24 are curved relative to a common plane extending perpendicular to the rotational axis. For clarity only one row 24 of holes 22 is shown.

It will be appreciated that, in the array of holes 22 shown in FIG. 5, it is possible to identify alternative rows of holes which are inclined to the row 24. However, for the purposes of the present invention, where holes 22 are referred to as being disposed in rows, the rows in question are those in which adjacent holes are spaced apart from each other by the smallest possible distance. In the embodiment shown in FIG. 5 the holes are circular, and at least 1 mm in diameter, and the holes in each row 24 are spaced apart (centre-to-centre distance) by at least 4 mm. It will, of course, be appreciated that the hole shape, size and spacing may vary according to the desired characteristics of the septum layer 20.

Figure 7:
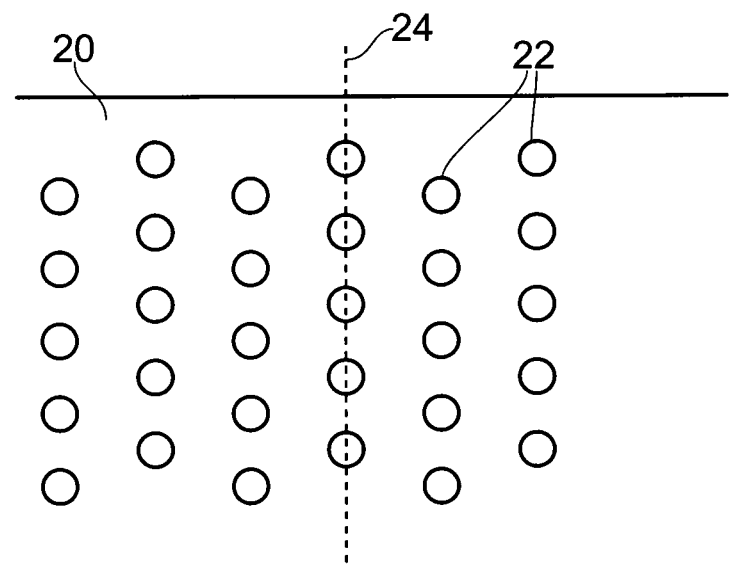
FIG. 7 is a view in the direction of arrow V of an alternative arrangement to that shown in FIG. 5.

In an alternative embodiment as shown in FIG. 7, the holes 22 are arranged such that the centre point of holes 22 in adjacent rows are substantially offset from one another. That is to say, the centre point of holes 22 are not aligned as shown in FIG. 5.

Referring to FIGS. 2 and 3, it will be appreciated that, during the process of bonding the abradable layer 14 to the septum layer 20, the two components are brought together in face-to-face relationship. The bonding agent, which may be any suitable settable or curable adhesive material, is applied to one or both of the opposing faces, and the abradable layer 14 is brought into contact with the septum layer 20 with the bonding agent disposed between them. In a preferred manufacturing method a vacuum bonding process is used, in which the components 14, 16 are placed in an enclosure which is then evacuated. The enclosure may take the form of a flexible bag so that evacuation of the interior of the bag causes the bag to collapse onto the components 14, 16 as air is extracted.

In a conventional process, with a continuous, unperforated septum layer 20, the evacuation step is sometimes insufficient to ensure that all air is removed from the region between the abradable layer 14 and the septum layer 20. Consequently, air bubbles remain in this region which prevent the bonding agent from making a complete bond across the entire contacting surface between the components.

In accordance with the present invention, the holes 22 provide a pathway for air to pass from the region between the abradable layer 14 and the septum layer 20, into the cells 18 of the layer 16 and thence to the exterior of the flexible bag in which vacuum bonding takes place. Consequently, because all air can be extracted from the region between the abradable layer 14 and the septum layer 20 a complete bond can be achieved over the entire surface of the abradable layer 14.

Furthermore, the bonding agent can penetrate into the holes 22, to provide a key enhancing the connection between the abradable layer 14 and the layer 16.

In operation of the engine represented partially in FIG. 1, ice may accumulate on the blades 12 of the fan to be shed under the centrifugal force applied to the ice as the fan rotates. The shed ice particles will be subjected not only to the centrifugal force, but also to forces imposed by the flowing gas passing over the blades 12. The consequence of these forces is that the ice particles are shed in the direction indicated by the arrows 26 in FIGS. 1 and 4. Thus, referring to FIG. 1, it will be appreciated that the ice will be shed in a direction which is inclined to the rear with respect to the radially outwards direction. Some ice particles will impinge on the ice impact panel 10, but some will be discharged from the radially outward end 12 and impinge on the liner panel 4.

As shown in FIG. 4, the trajectory of ice particles which are shed from the blade 12 will thus have a rearward inclination as viewed in a direction radially towards the rotational axis of the fan.

By contrast, if a blade 12 or a fragment of a blade 12 becomes detached from the rest of the fan it will be less influenced by the forces imposed by gas flow through the engine. Consequently, any detached blade or blade fragment will travel in the direction indicated by the arrows 28 in FIGS. 1 and 4. As shown in FIG. 1, the direction 28 has no axial component. As shown in FIG. 4, the detached blade or fragment will have a circumferential component of travel and consequently, as viewed in a direction towards the rotational axis of the fan, the blade or blade fragment will travel in a path lying generally within a single plane perpendicular to the rotational axis.

It will be appreciated from FIGS. 4 and 5 that the direction of travel 28 of a detached blade or blade fragment has both parallel (i.e., circumferential) and perpendicular components relative to the rows 24 of holes 22. By contrast, the path of travel 26 of ice shed from the blade surface is inclined to the rows 24. The path of travel 26 refers to larger ice debris, such as ice sheets shed from the blades. Small ice particles, such as hail, may have many different directions of travel but will result in only low energy impacts.

As a result, the septum layer 20 provides a greater resistance to fracture on impact by ice particles than it is to impact by blades or blade fragments. Because of this ice particles striking the liner panel 4 will be deflected back into the gas flow path through the engine without causing any deformation of or damage to the liner panel 4. By contrast a blade or blade fragment impinging on the liner panel 4 will relatively easily cause separation of the septum layer 20 along one or more of the rows 24 of holes 22. Consequently a detached blade or blade fragment will be able to pass through the septum layer 20 into the cellular structure of the layer 16, so as to become embedded in the layer 16 and prevented from returning to the gas flow, where it could cause serious damage to the downstream components of the engine.

The holes 22 therefore act as perforations, forming lines of preferential weakness in the septum layer 20, to assist a detached blade or blade fragment in passing into the cellular structure of the layer 16, where as the holes 22 offer no assistance to the passage of even large pieces of ice since adjacent holes in the direction of travel 26 of ice pieces are spaced apart by relatively large distances.

The invention claimed is:

1. A fan section of a gas turbine engine comprising:
   a fan having a rotational axis and radially extending fan blades from which ice may be shed in a first direction having a radial and an axial component during operation of the engine, and all or part of a blade of the blades may become detached so as to be ejected from the fan in a second direction having a radial and a circumferential component during operation of the engine, and
   a fan casing liner panel comprising
      a first sheet element of composite material and a second sheet element of cellular material having a septum layer on one surface of the cellular material, the first sheet element being bonded in face to face relationship to the septum layer of the second sheet element, wherein
      the septum layer is perforated, and the perforations comprise holes disposed in a plurality of rows to form lines of preferential weakness to ease passage of the blade or part thereof into the liner panel, each of the plurality of rows extending circumferentially about the rotational axis of the fan in a plane extending perpendicular to the rotational axis, each of the holes being spaced further apart from the nearest hole in an axial direction than from the nearest hole in the circumferential direction, the lines of preferential weakness being aligned with the circumferential component of the second direction, the holes being spaced further apart in a direction at an angle to the lines of preferential weakness to thereby provide lines of enhanced resistance to fracture by impact of ice shed in the first direction.

2. The fan section of claim 1, wherein the cellular material of the second sheet element comprises elongate cells which extend in a direction across the thickness of the second sheet element.

3. The fan section of claim 1, wherein the cellular material of the second sheet element is a metallic material.

4. The fan section of claim 1, wherein the first sheet element comprises a cellular composite material.

5. The fan section of claim 4, wherein the cellular composite material comprises a matrix of composite material having cells which are filled with a filler.

6. The fan section of claim 1, wherein the first sheet element is bonded to the septum layer over substantially the full area of the first sheet element.

7. The fan section of claim 1, wherein the rows of holes extend in the circumferential direction with respect to the rotational axis of the fan.

8. The fan section of claim 1, wherein the holes have a transverse dimension which is not less than 1 mm.

9. The fan section of claim 1, wherein adjacent holes are spaced apart by not less than 4 mm.

10. A gas turbine engine having the fan section of claim 1.

11. A method of manufacturing the fan section of claim 1, which method comprises the steps of:
   applying a bonding agent to at least one of the first sheet element and the septum layer;
   placing the first sheet element and the septum layer in face to face contact with the bonding agent between them;
   placing the first sheet element and the second sheet element in an enclosure;
   evacuating the enclosure to draw air through the perforated septum layer from the region between the first sheet element and the septum layer
   causing or allowing the bonding agent to set or cure.

12. A gas turbine engine manufactured by the method of claim 11.

* * * * *